(12) United States Patent
Roth et al.

(10) Patent No.: US 8,560,367 B2
(45) Date of Patent: Oct. 15, 2013

(54) COMPUTER-IMPLEMENTED CLOUD-BASED LITIGATION MANAGEMENT SYSTEM

(75) Inventors: Jonathan Roth, Philadelphia, PA (US); Aaron Yaffa, Chicago, IL (US)

(73) Assignee: Mercury Holdings LLC, West Deptford, NJ (US)

( * ) Notice: Subject to any disclaimer, the term of this patent is extended or adjusted under 35 U.S.C. 154(b) by 0 days.

(21) Appl. No.: 13/369,766

(22) Filed: Feb. 9, 2012

(65) Prior Publication Data
US 2013/0212063 A1 Aug. 15, 2013

(51) Int. Cl.
G06Q 10/06 (2012.01)

(52) U.S. Cl.
USPC .......................................... 705/7.12; 707/608

(58) Field of Classification Search
None
See application file for complete search history.

(56) References Cited

U.S. PATENT DOCUMENTS

| | | | |
|---|---|---|---|
| 6,549,894 B1 | 4/2003 | Simpson et al. | |
| 6,694,315 B1 | 2/2004 | Grow | |
| 7,076,439 B1 * | 7/2006 | Jaggi | 705/7.15 |
| 7,197,716 B2 | 3/2007 | Newell et al. | |
| 7,707,153 B1 | 4/2010 | Petito et al. | |
| 2002/0173975 A1 | 11/2002 | Leventhal | |
| 2004/0267593 A1 | 12/2004 | Sammons et al. | |
| 2005/0240578 A1 | 10/2005 | Biederman | |
| 2006/0129445 A1 * | 6/2006 | McCallum, Jr. | 705/8 |
| 2006/0178925 A1 | 8/2006 | Meece et al. | |
| 2006/0200374 A1 * | 9/2006 | Nelken | 705/9 |
| 2006/0206490 A1 | 9/2006 | Schiller | |
| 2006/0277054 A1 | 12/2006 | Benzrihem | |
| 2007/0271517 A1 | 11/2007 | Finkelman et al. | |
| 2008/0091504 A1 * | 4/2008 | Lyle et al. | 705/9 |
| 2008/0140498 A1 * | 6/2008 | Setty et al. | 705/9 |
| 2010/0100572 A1 | 4/2010 | Schiller | |
| 2010/0146058 A1 | 6/2010 | Naef | |

FOREIGN PATENT DOCUMENTS

| | | |
|---|---|---|
| WO | WO 0243306 | 5/2002 |
| WO | WO 2006001833 | 1/2006 |
| WO | WO 2009111799 | 9/2009 |

OTHER PUBLICATIONS

Pitale; Trends in E-Discovery; Retrieved on Feb. 7, 2012 from http://www.edmondsci.com/Trends_in_eDiscovery.pdf.
Doodle.com website retrieved on Feb. 8, 2012 from http://www.doodle.com.

* cited by examiner

Primary Examiner — Anteneh Girma
Assistant Examiner — Miranda Huang
(74) Attorney, Agent, or Firm — Leydig, Voit & Mayer, Ltd

(57) ABSTRACT

A system for managing litigation documents including a computer-readable medium having a litigation management application. The application has computer-executable instructions for managing documents. The system includes a server that executes the instructions for managing documents on the computer-readable medium. The system has a database containing document information. The database is arranged with the server such that the server can access and modify document information in the database. The application includes a first documents tab that receives inputs from a first user to upload documents to the database for display in the first documents tab. The application has a second documents tab that receives inputs from a second user. The application generates a notification for delivery to the second user when the first user uploads a document to the database. The application can display the document in the second documents tab when the first user uploads the document to the database.

20 Claims, 13 Drawing Sheets

COMPUTER-IMPLEMENTED CLOUD-BASED LITIGATION MANAGEMENT SYSTEM

BACKGROUND

Litigation, along with other forms of conflict or dispute resolution, can generate enormous amounts of paper and files that are cumbersome to store and manage. People, firms, and companies that handle high volumes of cases can have difficulty managing the large amounts of documents that result from each case. Organizing case documents in an accessible way with traditional paper or electronic methods can lead to confusion or redundancy.

Additionally, for each case, parties must keep track of deadlines, meeting times, and various other events. Parties on the same and opposing sides of cases must coordinate with each other to determine how to exchange documents, serve discovery, schedule events, etc. Traditionally, coordination of these tasks between parties is done by phone, by mail, or by e-mail, which can be extremely tedious and time consuming. Attorneys or others involved in different types of dispute resolution must somehow determine when each person required for a particular event is available. Determining a mutually agreeable time for an event to occur can require excessive correspondence, which wastes the time and money of the parties involved.

SUMMARY

The disclosure describes, in one aspect, a system for managing litigation events including a physical computer-readable medium having a litigation management application with computer-executable instructions for managing litigation events. The system also has a system a server that can execute the instructions for managing litigation events contained on the physical computer-readable medium. The system includes a database containing litigation management information and arranged with the server such that the litigation management event information in the database is accessible to the server and is modifiable by the server. The litigation management application includes a first case calendar that can receive inputs from a first user selecting at least one date for an event and generate a notification for delivery to a second case calendar. The litigation management application also includes a second case calendar that can receive inputs from at least a second user selecting at least one date for the event, and generate a notification for delivery to the first case calendar indicating the date the second user selected.

In another aspect, the disclosure describes a system for managing litigation documents including a physical computer-readable medium including a litigation management application having computer-executable instructions for managing litigation documents. The system also has a server that can execute the instructions for managing litigation documents contained on the physical computer-readable medium. The system has a database containing litigation management document information. The database is arranged with the server such that the litigation management document information in the database is accessible to the server and is modifiable by the server. The litigation management application includes a first documents tab that can receive inputs from a first user to upload at least one litigation document to the database for display in the first documents tab. The application also includes at least a second documents tab that can receive inputs from at least one second user. The application can also generate a notification for delivery to the at least one second user when the first user uploads a litigation document to the database. Further, the application can display the at least one litigation document in the at least one second documents tab when the first user uploads the document to the database.

In another aspect, the disclosure describes a method of managing litigation documents. The method includes accessing a physical computer-readable medium that includes a litigation management application having computer-executable instructions for managing litigation documents. The method also includes accessing a server that can execute the instructions for managing litigation documents contained on the physical computer-readable medium. The method includes accessing a database containing litigation management document information. The database is arranged with the server such that the litigation management document information in the database is accessible to the server and is modifiable by the server. The litigation management application includes a first documents tab that can receive inputs from a first user to upload at least one litigation document to the database for display in the first documents tab. The application also includes at least a second documents tab that can receive inputs from at least one second user. The application can also generate a notification for delivery to the at least one second user when the first user uploads a litigation document to the database. Further, the application can display the at least one litigation document in the at least one second documents tab when the first user uploads the document to the database.

DETAILED DESCRIPTION

As described briefly above, various embodiments of systems, methods, and computer program products for managing, organizing, and tracking litigation or any other conflict or dispute resolution proceeding are provided herein. In the following detailed description, references are made to the accompanying drawings that form a part hereof, and in which are shown by way of illustration, specific embodiments or examples. These embodiments may be combined, other embodiments may be utilized, and various changes may be made without departing from the spirit or scope of the present invention. The following detailed description is therefore not to be taken in a limiting sense, and the scope of the present invention is defined by the appended claims and their equivalents.

The present disclosure provides a collaborative "cloud-based" litigation management system. The system can also be used for other types of dispute resolution involving single or multiple parties, such as mediation, arbitration, insurance claims, etc. The disclosed litigation management system can be adapted to provide attorneys or legal support staff on any side of a litigation matter with the ability to upload, access, organize, share, collaborate, and serve documents from any device with access to the internet or other suitable mechanism. The system helps users to prepare for motion filing or trial by allowing printing of exhibits and other necessary documents. The litigation management system generates automated reminders for depositions, filing deadlines, or other important litigation events, and additionally includes a scheduling feature that will enable email-based corroboration between attorneys on dates for depositions and other litigation events.

Figure 1:
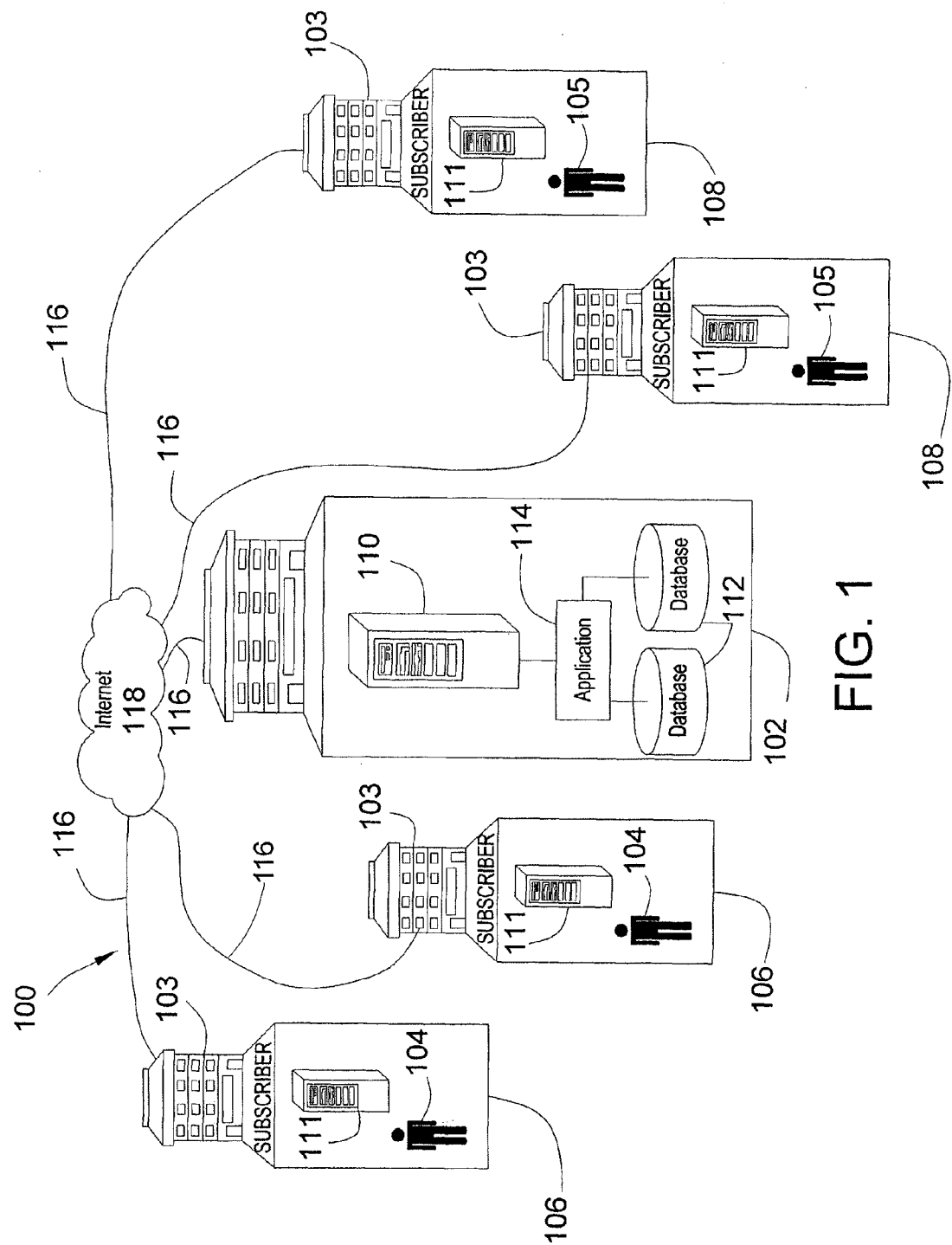
FIG. 1 is a schematic diagram of an embodiment of a computer-implemented litigation management system.

FIG. 1 shows an embodiment of a system 100 for accessing, sharing, and uploading documents in accordance with the principles of the present disclosure. FIG. 1 is merely one possible embodiment of a system 100, though one skilled in the art could conceive of similarly functioning systems. The system 100 includes a service provider 102 that collects and processes login and other information from subscribers 103. More specifically, in FIG. 1 the subscribers represent two law firms representing plaintiffs 106 and two law firms representing defendants 108, but subscribers could also represent any number of law firms, other legal representation, pro se plaintiffs or defendants, federal or state prosecutors, federal or state attorneys general or other government agents, criminal defendants, or any other type of legal representative.

The service provider 102 includes computer systems, such as a processer or server 110 and database 112 that selectively access, store, collect, and publish information according to the executing instructions of a litigation management application 114 operated on the server. The database 112 can generally include any type of system for storing data in non-volatile storage. This includes, but is not limited to, systems based upon: magnetic, optical, and magneto-optical storage devices, as well as storage devices based on flash memory and/or battery-backed up memory. In the illustrated embodiment in FIG. 1, the application 114 is a collection of computer executable instructions that is operated by the server 110 and that is able to store and retrieve information from the database 112. The server 110 can generally include any computational node including a mechanism for servicing requests from a client for computational resources, data storage resources, or a combination of computational and data storage resources. Furthermore, the server 110 can generally include any system that can be adapted to allow for the selective transmission of information to a subscriber 103 according to commands issued from the subscriber. The server 110 can generally include any component of an application that can receive input from the users 104, 105, process input, and present the output to the litigation management application 114 or the database 112.

Each subscriber 103 has users 104, 105 that can operate a computer system 111. These users 104, 105 can be attorneys, paralegals, or other support staff at a subscriber 103. The application 114 at the service provider 102 is accessible via communication channels 116, for example, established through a network, such as the Internet 118 or other suitable mechanism. Further, the computer system 111 can be a desktop computer, laptop computer, smart phone, personal digital assistant (PDA) or any other device that can connect to the Internet 118 through hard lines or wirelessly. By accessing the application 114 from a computer system 111 through the communication channels 116, a user 104, 105 can access specific information in the database 112.

In the illustrated embodiment, the service provider 102 maintains accounts on its computing environment for the subscribers 103 who remotely access the server 110 via the communication channels 116. Users 104, 105 at the subscribers 103 can enter specific login information associated with a specific user account and recognized by the application 114 to gain access to information on the database 112 and use of the application. The users 104, 105 can then view, upload, download, or otherwise access documents and information available to that specific user such as pleadings, motions, other filings, or calendars. When the application 114 is executed, it draws the specific requests for information for each subscriber 103 from the database 112 and provides access to the users 104, 105. Sets of rules integrated with the application 114 allows only certain users 104, 105 to access certain information in certain databases 112 depending on a user's entered login information. If, according to the application's 114 integrated rules, the application 114 determines that a user 104, 105 has permission to view certain information on the database 112, the information can be accessed via the communication channels 116 and viewed from a computer system 111. On the other hand, if the application's 114 rules determine that a user 104, 105 does not have permission to view certain information, the application will not allow that user to access that information, e.g., documents, case calendars, etc.

Figure 2:
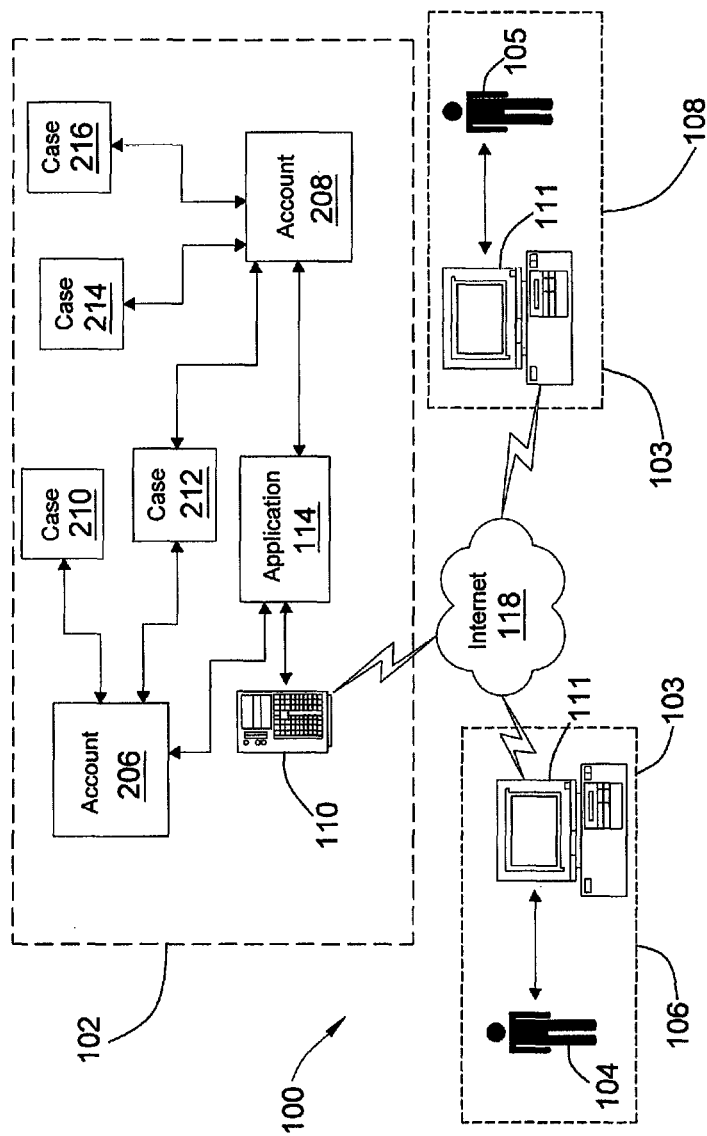
FIG. 2 is a schematic diagram of an embodiment of a computer-implemented system having a physical computer program product including computer-executable instructions for managing litigation.

FIG. 2 is a schematic of an embodiment of the system 100. In this embodiment, user 104 is an employee of law firm 106, and user 105 is an employee of another law firm 108. Each law firm 106, 108 is a subscriber 103 and each has accounts 206, 208, respectively, with the service provider 102. Each subscriber 103 is registered with the service provider 102 to create these accounts. For user 104 to access that user's profile on its employer's account, the user utilizes a computer system 111 to open a standard internet browser such as Microsoft Internet Explorer, Mozilla Firefox, or any other type of internet access software, which connects the subscriber's computer system 111 to the internet 118. Upon entering certain URL information corresponding to an internet location on the service provider's 102 server 110 or other data storage location, the internet browser displays a login screen 302 for the application 114 such as that illustrated in FIG. 3. The application 114 in the illustrated embodiment is run through the internet browser but, alternatively, the application can run as separate executable software installed onto the computer system 111.

Figure 3:
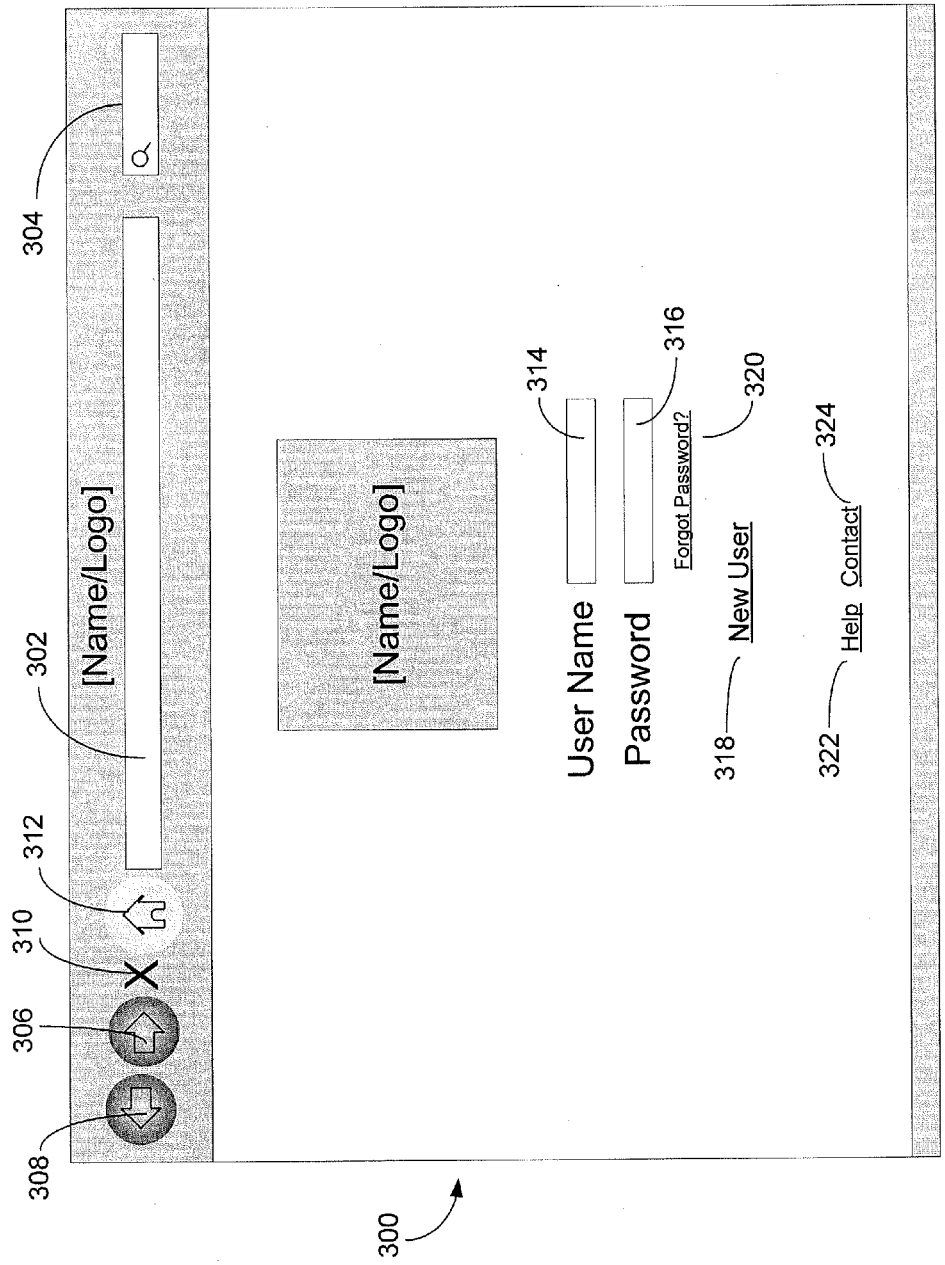
FIG. 3 is a screenshot of an embodiment of a login screen for a computer-implemented litigation management system.

The login screen 300 will vary depending on the individual service provider 102, and is conducive to many different designs. The embodiment illustrated in FIG. 3 shows a login screen 300 in a window from a generic internet browser, including an address bar 302, a search bar 304, a forward button 306, a back button 308, a stop button 310, and a home button 312. The login screen 300 itself features a User Name entry box 314 and a Password entry box 316, where the user 104, 105 enters the specific subscriber 103 login information corresponding to that subscriber or user. A subscriber 103 can have general login information, or additionally have individual login information for each of its users 104, 105. The first time a subscriber 103 or user 104, 105 visits the login screen 300, he or she will need to select the New User hyperlink 318. The New User hyperlink 318 will bring the user 104, 105 to another web page where the user can set up account and login information for use in future visits. The login information consists of at least a unique username and a password. The login screen 300 also includes a Forgot Password? hyperlink 320, a Help hyperlink 322, and a Contact hyperlink 324. If a user 104, 105 should forget its password and is unable to complete the login information as a result, the user can select the Forgot Password? hyperlink 320. The internet browser then displays a web page providing instructions as to how the user 104, 105 can recover its current password or create a new password. Selecting the Help hyperlink 322 and the Contact hyperlink brings a user 104, 105 to respective web pages containing information to help the user or contact information as established by the service provider 103.

Figure 4:
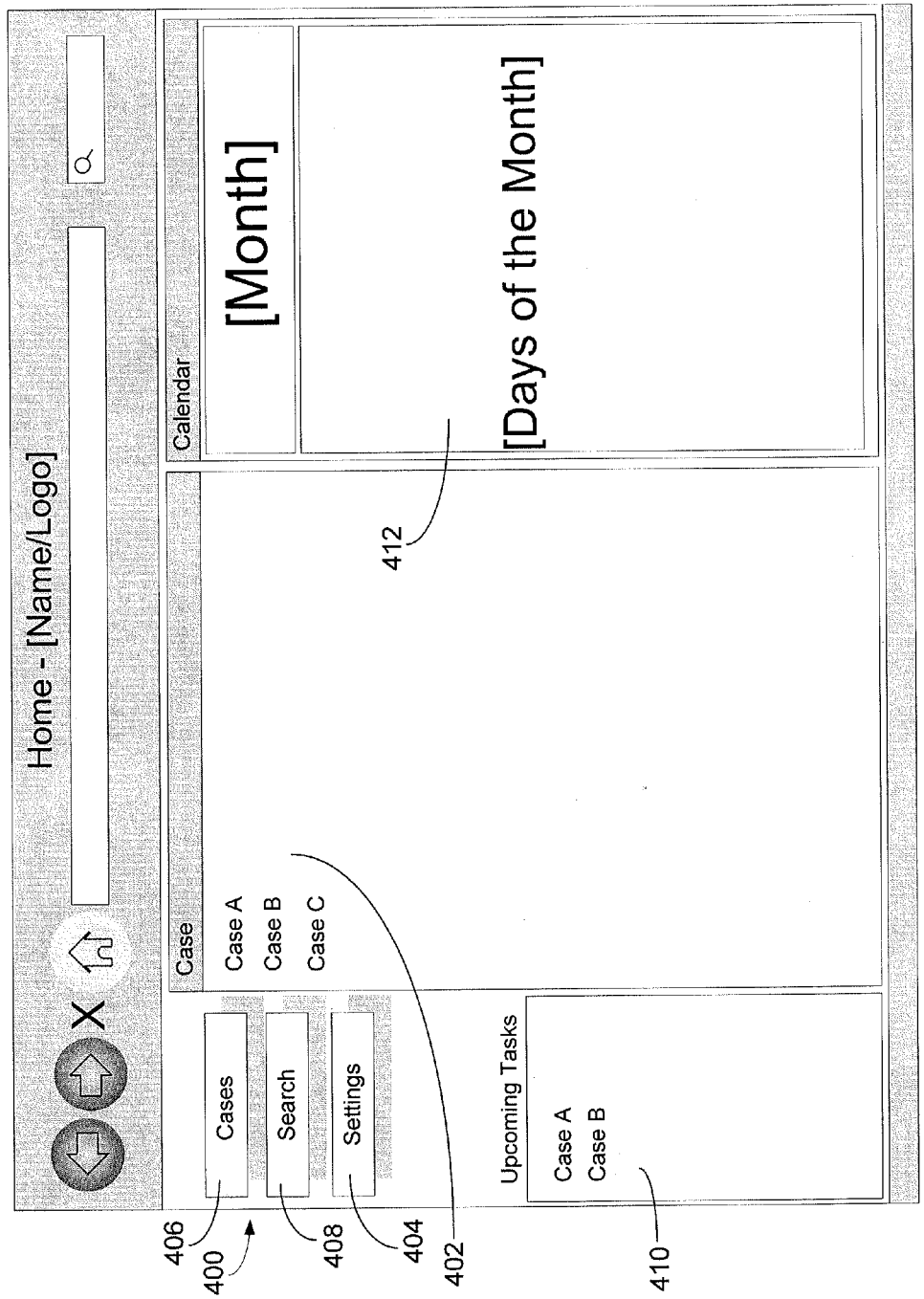
FIG. 4 is a screenshot of an embodiment of a home screen for a computer-implemented litigation management system.

After the user 104, 105 has entered proper subscriber 103 or user login information at the login screen 302, the application 114 within the internet browser displays the user's Home screen 400. An embodiment of the Home screen 400 is illustrated in FIG. 4, but the service provider 102 can display the information in various alternative ways at its choosing. The Home screen 400 shows the user 104, 105 various pieces of information and also acts as a conduit for the user to access other features of the application 114. In the illustrated embodiment, the Home screen 400 features a Case list 402. The Case list 402 displays all the cases with which that user's 104, 105 account 206, 208 is affiliated. For example, in FIG. 2, account 208 is affiliated with cases 212, 214, and 216, while account 206 is affiliated with case 210 and 212. The Home screen 400 also includes a Settings button 404, a Cases button 406, a global Search button 408, a global Upcoming Tasks list 410, and a global calendar 412.

Figure 5:
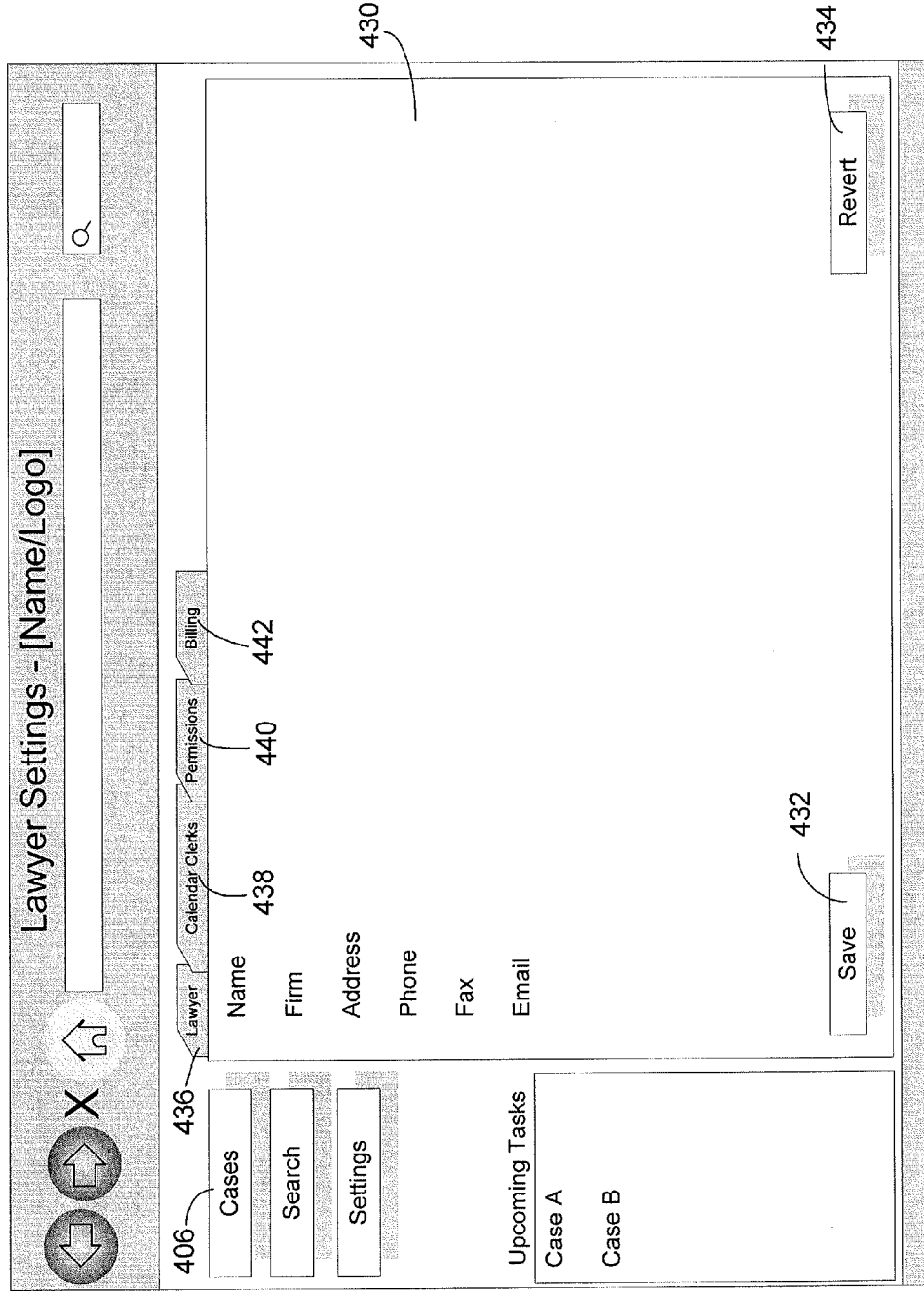
FIG. 5 is a screenshot of an embodiment of a settings screen for a computer-implemented litigation management system.

When a user 104, 105 selects the Settings 404 button, the application displays the Lawyer Settings screen 430. FIG. 5 shows an embodiment of the Lawyer Settings screen 430, but other design options are available to the service provider 102. On the Lawyer Settings screen 430, the user 104, 105 can enter personal identification and contact information, such as name, firm, address, phone number, fax number, e-mail address, or any other piece of information. The Lawyer Settings screen 430 also includes a Save button 432 and a Revert button 434. Once the user 104, 105 has entered the desired information, the information can be saved to the account on the database 112 by clicking the Save button 432. Alternatively, the user 104, 105 can click the Revert button 434 to revert the account information on the screen back to a default or previously saved state. The Lawyer Settings screen 430 also features tabs, such as a Lawyer tab 436, a Calendar Clerks tab 438, a Permissions tab 440, and a Billing tab 442. A user 104, 105 can select these tabs to respectively alter settings information for lawyers, calendar clerks, permissions, and billing.

Figure 6:
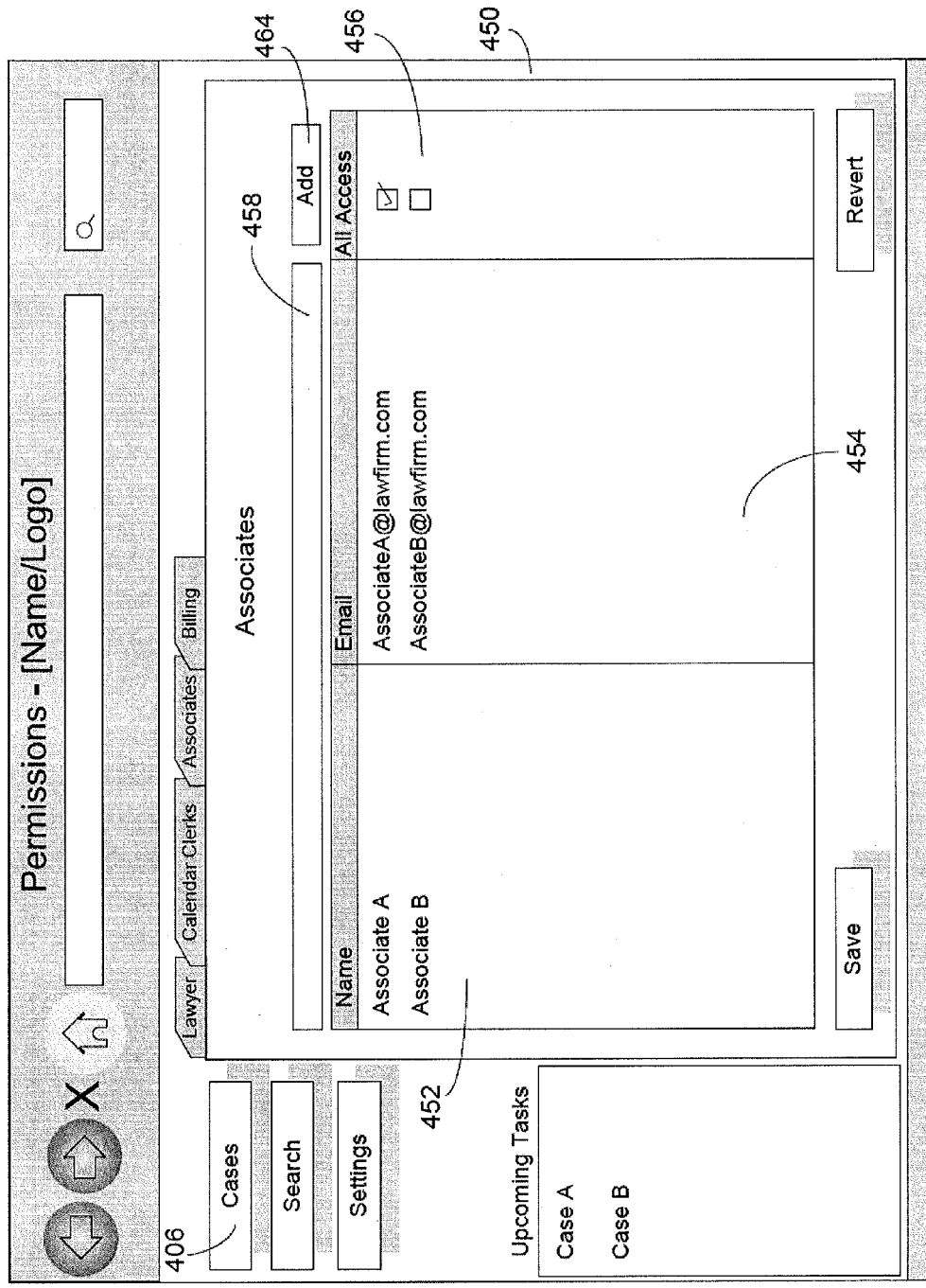
FIG. 6 is a screenshot of an embodiment of a permissions screen for a computer-implemented litigation management system.

When a user 104, 105 selects the Permissions tab 440 on the Lawyer Settings screen 430, the application 114 displays the Permissions screen 450. The Permissions screen 450 allows a user 104, 105 having proper authorization credentials to indicate the specific people that will have access to the information on that user's account within the application 114. These people could be administrative assistants, paralegals, or any other person the user 104, 105 wishes to grant access. FIG. 6 shows an embodiment of the Permissions screen 450 that features a Name column 452, an Email column 454, and an Access column 456 that display the names, e-mail, and access settings information for each person an authorized user 104, 105 has entered. The Permissions screen 450 also has a text entry box 458, an Add button 464 a Save button 460, and a Revert button 462. Similar to the Lawyer Settings screen 430, the Save button 460 is used by the user 104, 105 to save information to the account and the Revert button 462 is used to revert the account information to a previously saved state. An authorized user 104, 105 uses the text entry box 458 to type the name, e-mail address, or other piece of identifying information of a person whom the user wishes to add to the Permissions screen 450. Once the user 104, 105 has entered the proper identification information for a particular person, the user selects the Add button 464 to add that person's name and/or e-mail to the respective columns. At that point, the user 104, 105 determines what access the added person will have to the information for a given account by selecting the proper check-box in the Access column 456. The Permissions screen 450 shown in FIG. 6 gives the user 104, 105 the option of selecting a check-box to indicate all access if the box is checked or no access if the box remains unchecked. Alternatively, the Access column 456 can have additional levels of access, such as read-only access, or any other access level between all access and no access.

Figure 7:
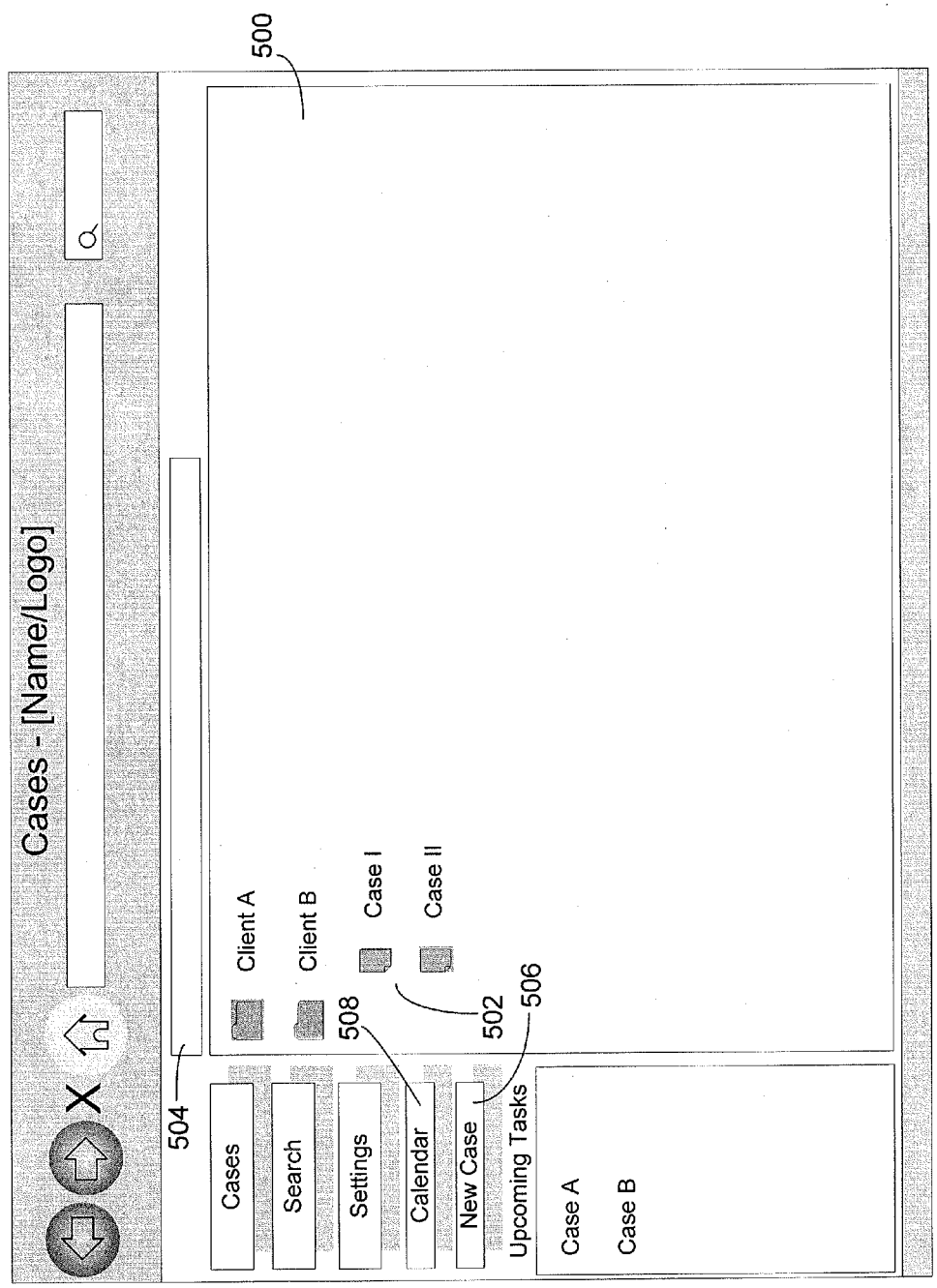
FIG. 7 is a screenshot of an embodiment of a cases screen for a computer-implemented litigation management system.

When a user 104, 105 selects the Cases button 406, the application 114 displays the Cases screen 500. FIG. 7 shows an embodiment of a Cases screen 500 having client list 502, a filter text box 504, a New Case button 508 and a Calendar button 506. The client list 502 displays a list of clients to which the logged-in user 104, 105 has access. When the user 104, 105 selects a particular client from the client list 502, the client list 502 also displays each case for that client. The user 104, 105 can enter a client name, partial client name, case name, or partial case name into the filter text box 504 to filter the clients or cases displayed in the client list 502.

Figure 8:
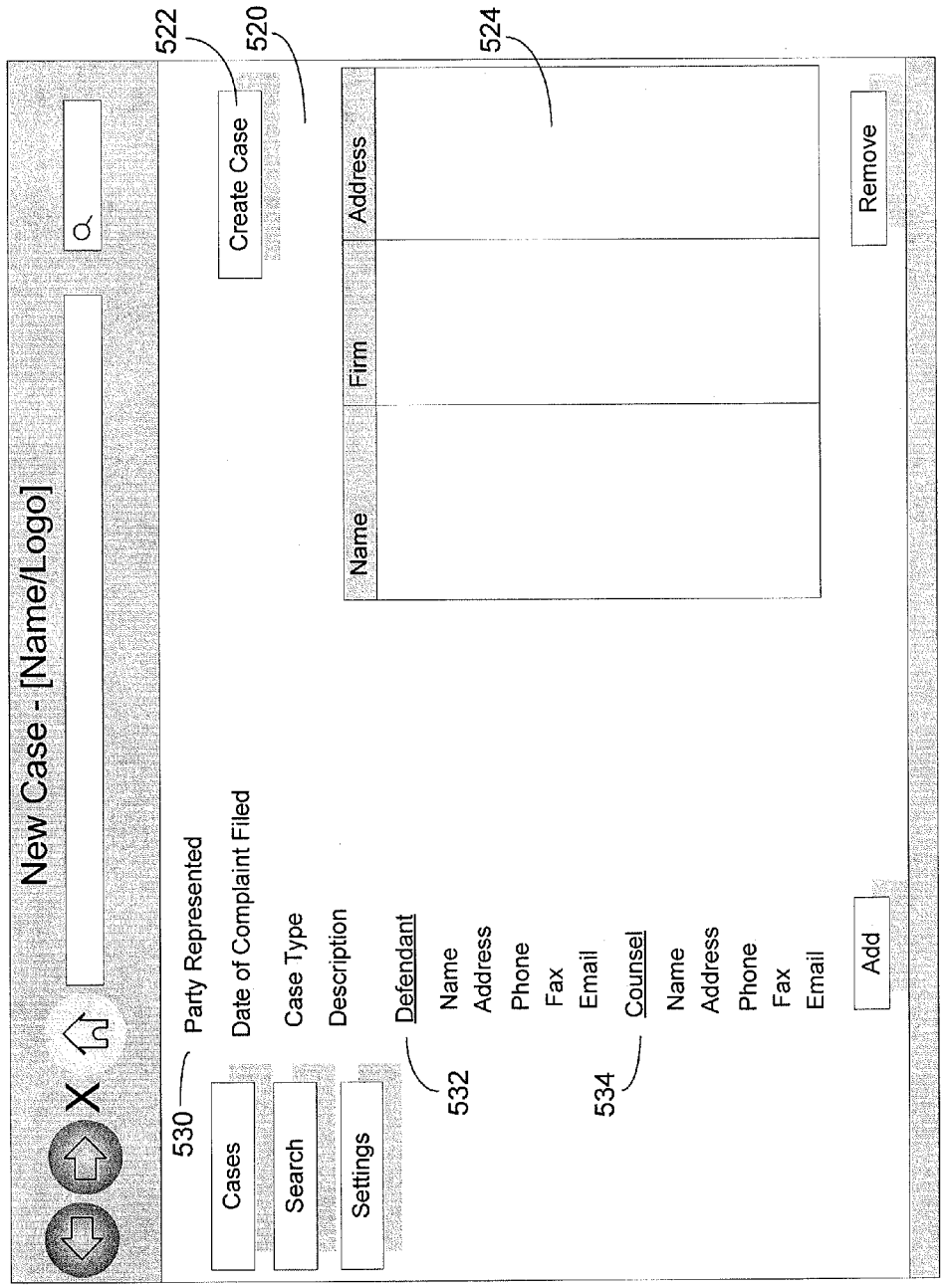
FIG. 8 is a screenshot of an embodiment of a new case screen for a computer-implemented litigation management system.

When a user 104, 105 would like to create a new case for a client, the user can select the New Case button 506. When a user 104, 105 selects the New Case 506 button, the application displays the New Case screen 520, which allows a user to enter information to add a new case to an account. FIG. 8 shows an embodiment of the New Case screen 520 that has a section for information about the party represented, a section for information about the opposing party, a section for information about opposing counsel, and a contacts table 524. The New Case screen 520 also has a Create Case button 522, an Add button 526, and a Remove button 528. In the party represented section 530, a user 104, 105 can enter information about the client represented in that particular case such as the name of the client or client company, the date the complaint was filed, the case type, a description of the case, or any other relevant information. In the opposing party section 532, a user 104, 105 can enter information such as the name of the opposing party or company, its contact address, phone number, fax number, e-mail address, or any additional relevant information. In cases where multiple parties are opposed, the opposing party section 532 could include information on multiple parties. In the opposing counsel section 534, a user 104, 105 can enter information about the counsel representing the opposing party such as the lawyer or firm name, address, phone number, fax number, e-mail address, or any additional relevant information. In cases where multiple parties are opposed, an opposing counsel section 534 can be present for each opposing party. A user 104, 105 can select the Add button 526 to add information about an opposing party or opposing counsel, or press the Remove button 528 to remove information about an opposing counsel or opposing party. The contacts table 524 where the user 104, 105 can enter contact information for attorneys or other personnel involved in the case. The contact table 524 shown in FIG. 8 contains a Name column 530, a Firm column 532, and an Address column 534, but any additional information about contacts can be included in this list such as e-mail address or telephone number. Once a user 104, 105 has entered all the desired information into the New Case screen 520, the user selects the Create Case button 522. The application 114 will then save the new case information on the database 112 and add the case and client to the client list 502.

Figure 9:
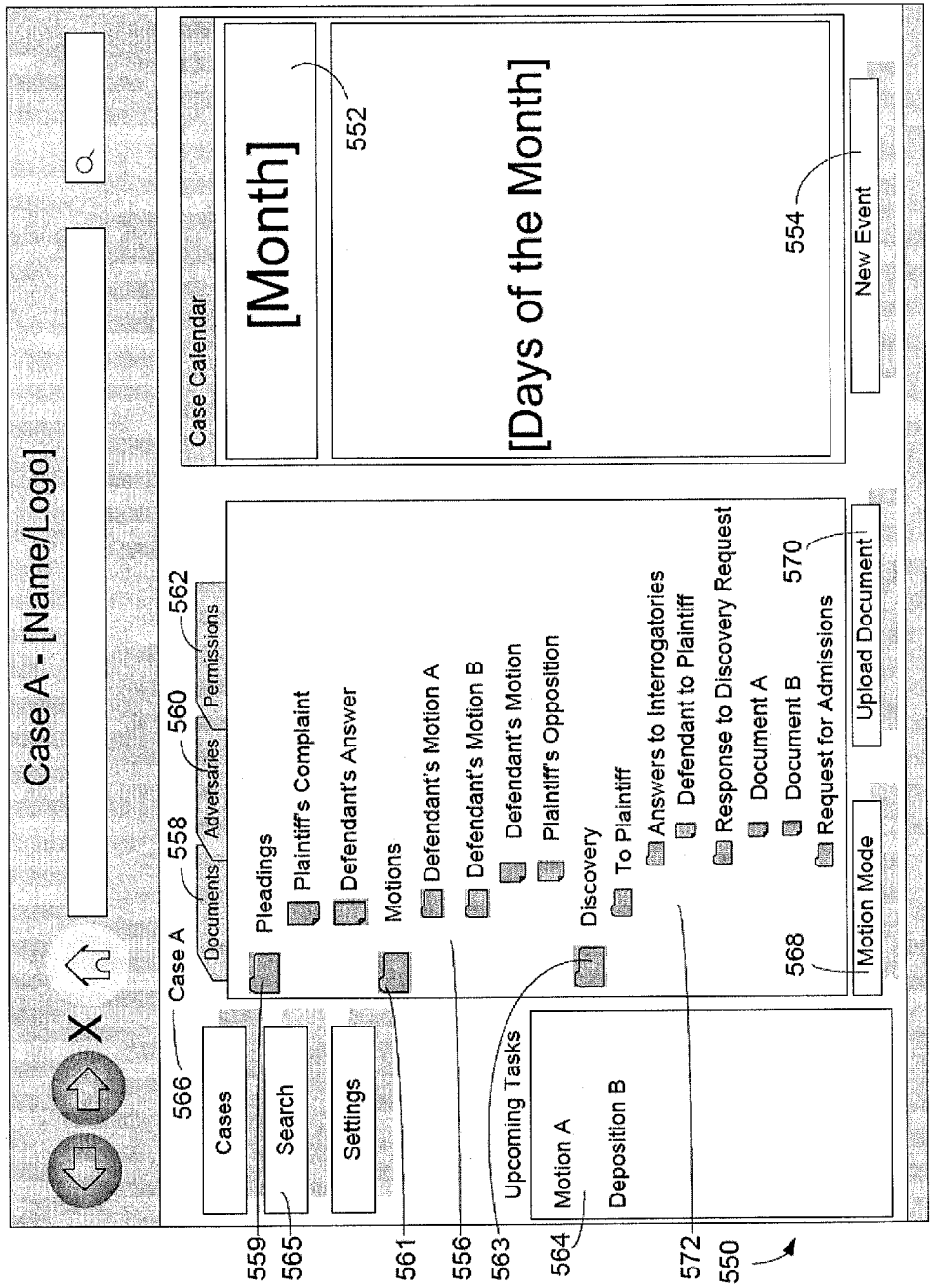
FIG. 9 is a screenshot of an embodiment of a case screen for a computer-implemented litigation management system showing an embodiment of a litigation documents list.

When a user 104, 105 selects a case from the client list 502, the application 114 displays the Case screen 550 for that particular case. The Case screen 550 displays various documents, event dates, tasks, and other information relevant to a specific case. FIG. 9 shows an embodiment of a Case screen 550 having a case calendar 552, a new event button 554, and an information window 556 having a Documents tab 558, an Adversaries tab 560, and a Permissions tab 562. The Case screen 550 also has an case specific Upcoming Tasks list 564, shows the Case Title 566, an exhibit mode button 568, and an Upload Document button 570.

When a user 104, 105 selects the Documents tab 558, a litigation documents list 572 populates the information window 556, as shown in FIG. 9. If a user 104, 105 wants to add a document to the document list 572, the user selects the Upload Document button 570. The application 114 then allows the user 104, 105 to browse the computer systems 111 located at the subscriber 103 or any other available data storage repository from which a document can upload. Copies of the uploaded documents are saved where the application 114 can access them, for example, on the service provider's 102 server 110, database 112, or some other computer memory storage. The uploaded documents can be sorted into folders and sub-folders, such as a Pleadings folder 559, a Motions folder 561, a Discovery folder 563, a Depositions folder (not shown), etc., as illustrated in one embodiment in FIG. 9. When a user 104, 105 uploads a document, the application 114 generates a notification to other registered users for that case, e.g., by e-mail, that includes a link to view that uploaded document either in the application or independent of the application, or includes the document as an e-mail attachment. The application 114 then displays the document uploaded by the user 104, 105 on the other registered users' Documents tab 558, where each authorized user can access the document.

Selecting the Pleadings folder 559 causes the application 114 to display all the pleadings that have been filed in the case in the Case Title bar 566. The user 104, 105 chooses whether the application 114 lists the pleadings chronologically, by filing party, or any other listing order. Similarly, when a user 104, 105 selects the Motions folder 561, the application 114 displays all the motions that have been filed in that particular case in chronological order, by party, or any other listing order. The Pleadings folder 559 and the Motions folder 561 give a user 104, 105 easy access to all the pleadings and motions in a particular case.

Selecting the Discovery folder 563 causes the application 114 to display all of the discovery that has been propounded and answered in that case. These items are arranged either by date uploaded, grouped by request and respective response, or in any other list order. When a user 104, 105 uploads a discovery request, the application will prompt the user to indicate what type of discovery request is uploaded and the parties to which the discovery request is directed. The application 114 recognizes the type of discovery request and calculates the deadline date for responding to that request. If the responding party does not file and/or upload the proper responsive discovery information by the calculated response deadline, the application 114 generates reminder e-mails that it sends to the attorneys' e-mail addresses stored within the application as representing the parties from which discovery was requested, such as those attorneys entered in the Adversaries list 592. If those attorneys are subscribers 103 and users 104, 105 registered to that case, the application 114, at the users' option, will also add the response deadline to the responding user's case calendar 552 and global calendar 412, or the calendar of a user-clerk or assistant working for that attorney. The application 114 will generate similar reminder notifications at intervals following the response deadline until the response is filed and/or uploaded, for example, every two weeks. A user 104, 105 has options as to how responses to discovery requests are organized under the Discovery folder 563. For example, FIG. 9 shows responses listed as folders in which the responding party uploads each document pertaining to that response labeled separately. This enables the requesting party/user 104, 105 to easily access items specific to a particular discovery request, but other organizational schemes can be used.

Some items produced and uploaded by a responsive party could be particularly sensitive documents, such as medical records or financial records. In these situations, a responsive user 104, 105 has the option of password-protecting those individual documents to further control who has access. Access to these sensitive documents can also be limited to particular users 104, 105 under the Permissions tab 562 discussed below.

Once a user 104, 105 from a responsive party uploads a requested discovery document, the application 114 would automatically label the document pages with the proper Bates label corresponding to that particular party in that case. The application 114 keeps track of the Bates labels distributed throughout the case to ensure that numbers continue where previously produced documents left off and no repeated Bates numbers are used. The application 114 can ascertain the date for the close of discovery in a case from a user's 104, 105 case calendar as described below. When the discovery period for a case is coming to a close, a user 104, 105 can set a predetermined time prior to the closing date for the application 114 to generate a reminder notification to the users in a particular party, or across all users registered to a case. The notification reminds the user 104, 105 of the discovery end date, and lists which discovery documents remain unanswered or incomplete, or additionally discovery items that have been answered or completed. The application 114 sends the notification either via e-mail to a listed e-mail address stored within the application or to a user's 104, 105 Home screen 400 or case screen 550.

Selecting the Deposition folder in the Documents tab 558 will prompt the application 114 to display a list of all the transcripts for depositions taken in the case that have been uploaded to the application. The depositions are listed in chronological order, alphabetical order, or any other order desired by a user 104, 105. The deposition listings include the date the deposition was taken, the name of the deponent, and the relationship of the deponent in the case, for example, defendant, plaintiff, third party, etc. Alternatively, the depositions can be listed as folders labeled with a deponent's name or other appropriate indicator. The folders can contain copies of the deposition transcript in full or condensed form, as well as copies of all the exhibits introduced during the deposition. The exhibits can be placed in a separate folder within the specific deposition folder or listed as individual files in the specific deposition folder. The exhibit document copy in this folder should be a photocopy of the exhibit that was introduced during that deposition that includes the exhibit number sticker or stamp.

Figure 10:
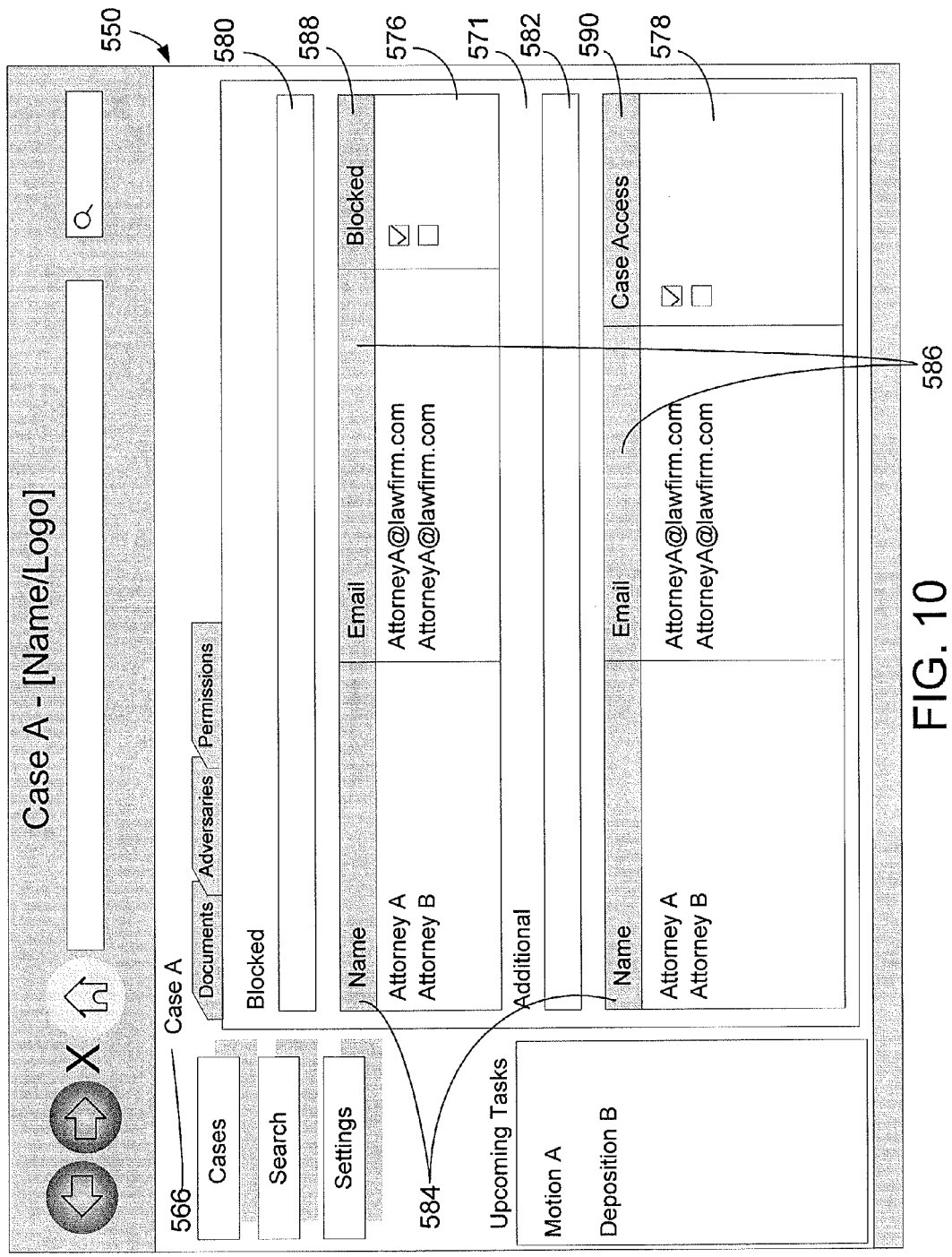
FIG. 10 is a screenshot of an embodiment of a case screen for a computer-implemented litigation management system showing an embodiment of a permissions screen

When a user 104, 105 selects the Permissions tab 562, the application 114 displays the permissions screen 571 for the selected case in the information window 556 of the Case screen 550. The embodiment shown in FIG. 10 indicates the selected case in the Case Title bar 566, a Blocked list 576, and an Additional access list 578. Each respective list has a filter text box 580, 582, a Name column 584, and an Email column 586. The Blocked list 576 has a Blocked column 588, while the Additional access list 578 has a Case Access column 590. The Blocked list 576 displays to the user 104, 105 the attorneys or other people's names whose access to the specific case is blocked. The application 114 allows a user 104, 105 with the proper credentials as recognized by the application to changed the permissions settings. The credentialed user 104, 105 can block or unblock certain users from accessing the files of a particular case by selecting or unselecting an indicator in the Blocked column 588. In FIG. 10, the indicator is a standard check-box, where a user 104, 105 is blocked if the box is checked, and unblocked if the box is unchecked, but any other type of indicator can be used. Similarly, a properly credentialed user 104, 105 can grant users access to a case using the indicators in the Case Access column 590.

Figure 11:
FIG. 11 is a screenshot of an embodiment of a case screen for a computer-implemented litigation management system showing an embodiment of an adversaries list.

The user 104, 105 can select the Adversaries tab 560 to cause the application 114 to populate the information window 556 with the Adversaries list 592. An embodiment of the Adversaries list 592 is shown in FIG. 11, but other configurations are possible. The Adversaries list 592 displays the names and contact information for all the parties and attorneys in a given case. The embodiment in FIG. 11 shows information for a Plaintiff, Defendant A, and Defendant B. For each party named, the Adversaries list 592 indicates the attorney's name, contact information, and firm name. A user 104, 105 having proper authorization credentials can edit the Adversaries list 592 as parties or attorneys change throughout a case.

Figure 12:
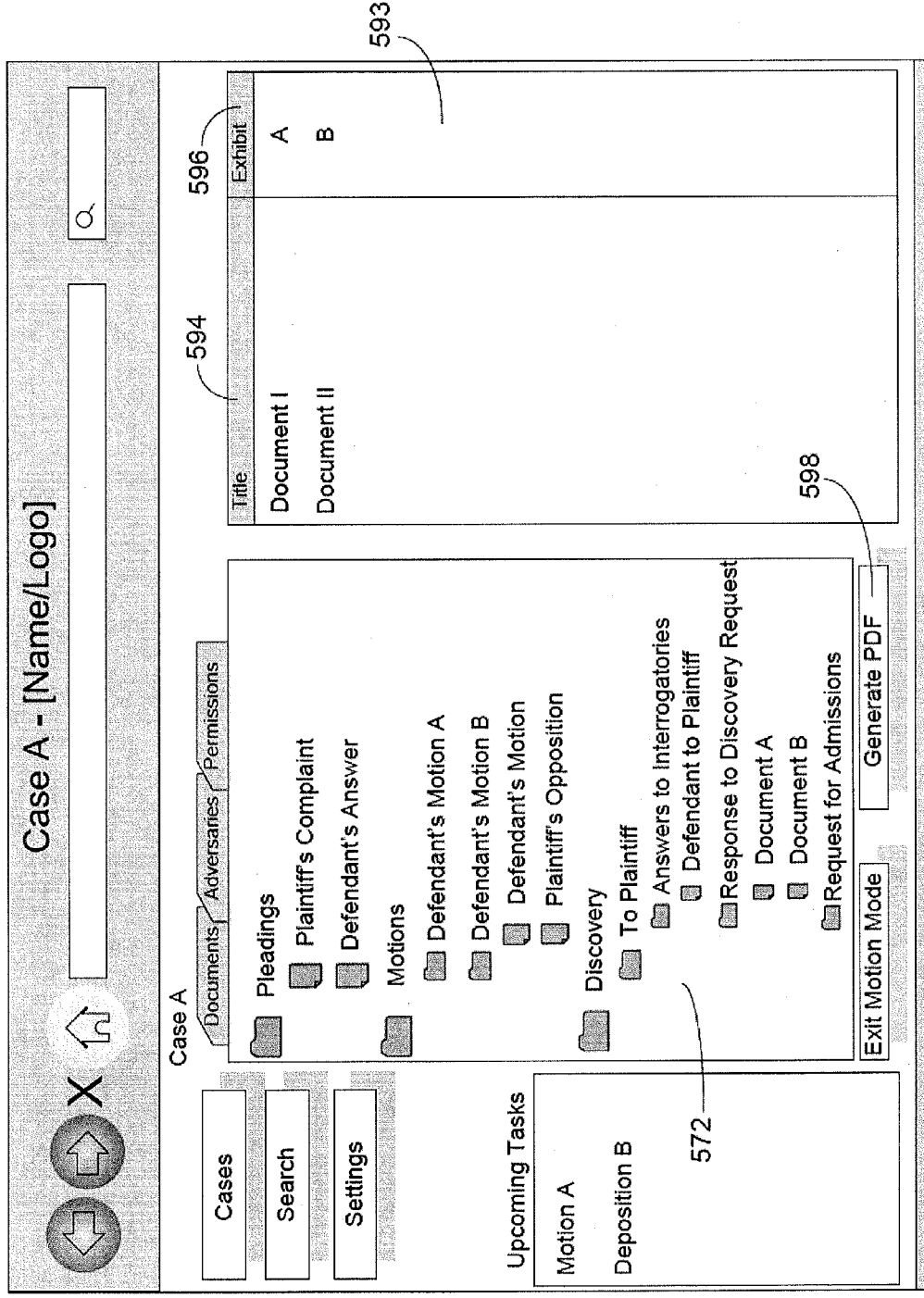
FIG. 12 is a screenshot of an embodiment of a case screen for a computer-implemented litigation management system showing an embodiment of an exhibit list window.

As shown in FIG. 9, when a user 104, 105 has selected the Documents tab 558 on the Case screen 550, the user can select the exhibit mode button 568 to enter exhibit mode. The embodiments shown in the figures use the term "Motion Mode" to label the exhibit mode button 568. This label or any other label for this setting can be used. When the exhibit mode button 568 is selected, the application will display an exhibit list window 593 used in preparing motions throughout a case. The embodiment in FIG. 12 shows an exhibit list window 593 that includes a Title column 594 and an Exhibit column 596. When the application 114 is in exhibit mode, a user 104, 105 can select documents from the document list 572 for use as exhibits in a motion. In the embodiment illustrated in FIG. 12, the user 104, 105 can add a document to the exhibit list window 593 by selecting that document in the document list 572, dragging the document into the exhibit list window, and dropping the document by unselecting it. Adding documents may also may also be accomplished by double-clicking, browsing, or any other suitable manner. The application 114 will then display the document title in the Title column 594, and the exhibit number or letter attributed to that document in the Exhibit column 596. The user 104, 105 may change the order of the documents in the Exhibit list window 593 by selecting and dragging the document title up or down as desired. When the user 104, 105 moves the documents in the exhibit list window 593, the corresponding exhibit letter or number in the Exhibit column 596 changes such that the documents in the exhibit list window are displayed in alphabetical or numerical order. This way, a user can easily alter the order in which the exhibits for a given motion are structured.

Once a user 104, 105 has added the desired documents to the exhibit list window 593 and arranged them in their proper order, the user can select the Generate PDF button 598, which can alternatively have any other suitable label. When the user 104, 105 selects the Generate PDF button 598, the application 114 generates a file in portable document format (PDF) that includes copies of all the documents listed in the exhibit list window 593 in the order listed. At the user's 104, 105 option, the PDF file can include divider pages between each exhibit document that include a designation of the exhibit number or letter, for example, Exhibit 1 or Exhibit A. The user 104, 105 then has the option of either saving the PDF file with the exhibits onto the subscriber's 103 computer system 111 or any other available computer system memory, or printing the PDF file onto paper. At any time while in exhibit mode, the user can select the exit exhibit mode button 599 to exit exhibit mode and return to the Case Screen 550. Similar to above, the exit exhibit mode button 599 in the illustrated embodiment shown in the figures is labeled "Exit Motion Mode," but any other suitable label can be used.

The application 114 also provides the user 104, 105 the ability to print exhibits for use at trial or otherwise. A user 104, 105 can select the exhibit mode button 568 to cause the application 114 to display the Exhibit list window 593 and drag and drop the documents from the Documents tab 558 that are needed for trial. The user 104, 105 can choose the order in which the documents are presented and the appropriate labeling. The user 104, 105 can then either create a PDF file with the documents in the order they appear in the Exhibit list window 593 or print the exhibits in order. Alternatively, the application 114 can send a request to a copy center, such as FedEx Office® or any other copy center, to print and bind the exhibits in a specific order.

Figure 13:
FIG. 13 is a screenshot of an embodiment of a new event screen for a computer-implemented litigation management system.

The case calendar 552 on the Case screen 550 shows litigation events entered into the calendar such as deposition dates, deadlines for pleadings, deadlines for motions, discovery deadlines, or any other case events a user 104, 105 chooses to enter. The case calendar 552 is case specific, meaning it only displays litigation events specific to the case displayed in the Case Title bar 566 on the Case Screen 550. If a user 104, 105 would like to add an event to the case calendar 552, the user can select the New Event button 554. When the New Event button 554 is selected, the application 114 displays the New Event screen 600, an embodiment of which is shown in FIG. 13. The New Event screen 600 has an enlarged view of the case calendar 552 and information boxes including an event Title box 602, an Invitees box 604, a Location box 606, a Proposed Dates/Times box 608, and any other information box appropriate for scheduling events. The user 104, 105 enters the title of the event to be scheduled in the event Title box 602, and enters one or more potential locations for the event in the Location box 606. The user 104, 105 can enter zero or more invitees in the Invitees box 604 either by typing in the name of the invitee or selecting names from a list of users registered to the particular case, such as co-counsel, opposing counsel, calendar clerks, or any other user. The user 104, 105 can also enter a proposed date and time or multiple dates and times by entering date(s) and time(s) in the Proposed Date/Times box 608 or, alternatively, the user can select the desired date(s) and time(s) on the case calendar 552. When invitees are selected, the application 114 will prompt the user 104, 105 as to whether the user would like the application to send a notification to the selected invitees informing them of proposed event. If the user 104, 105 opts to send a notification, the application 114 will generate a notification and send it to each of the invitees. If an invitee is a user 104, 105 registered to the particular case, the application 114 will send an e-mail to the address that has been entered into the application for that particular invitee or, alternatively or additionally, send a notification that will appear in the invitee's Home screen 400 or global case calendar 412 when that invitee logs onto the application with his or her own credentials. The notification includes information such as who proposed the event, the title of the event, the location of the event, and the dates and times proposed by the user. If the invitee is not a user 104, 105, the application 114 can send a notification to any e-mail address provided by the user scheduling the event.

Some events may not require an invitee to respond to a notification generated by the application 114, such as, for example, due dates for pleadings or other filings. In these cases, the invitee can simply select an option on the notification to add that event to his or her case calendar 552. Other events, however, such as depositions or meetings, may require the invitee to provide a response. For these events, the event notification received by each invitee allows the invitee to select which of the proposed dates, times, and locations for which that invitee can be available, or to select that the invitee is available for none of the proposed dates or at none of the proposed locations. The application 114 allows the invitee to make this selection by displaying buttons that the invitee can select corresponding to each option, displaying a calendar that highlights the proposed dates, times, and locations that can be selected, or any other suitable means. Once the invitee has made a selection, a notification of that invitee's selection is sent to the e-mail or Home screen 400 of the user 104, 105 that originally proposed the event. Once each invitee has responded with his or her availability, the user 104, 105 that proposed the event can select a common date and/or location that is available to all or some of the parties involved. When that user 104, 105 selects a final date and location, the application 114 generates another notification to each invitee of the final, agreed upon date, time, and location. The invitee(s) and the user 104, 105 that originally scheduled the event will then have the option of adding that event information to his or her case calendar 552 and/or global 412. Alternatively or in addition, a user 104, 105, such as an attorney, can designate another user, such as a calendar clerk or secretary, to receive the notifications sent to that attorney user.

At some designated time selected by the user 104, 105 prior to a scheduled event, e.g., one day or one week, the application 114 generates a notification, via e-mail or otherwise, to the user that originally proposed the event asking that user to confirm or cancel the scheduled event. The user 104, 105 can indicate whether the event is confirmed, cancelled, or modified, and the application 114 then generates a notification to each invitee that the event is either confirmed, cancelled, or modified depending on the original user's 104, 105 response. Once again, this notification is provided either by e-mail or a message to an invitee's Home screen 400. In one embodiment, if the scheduled event is a deposition, the application 114 can generate a notification to the user 104, 105 representing the party who is producing the witness to be deposed prior to the deposition, for example, a day prior to the scheduled deposition. The application 114 prompts the user 104, 105 to confirm or cancel the scheduled deposition, and each invitee receives a notification of the user's confirmation or cancellation. If the user 104, 105 representing the party producing the witness opts to cancel the deposition, the application 114 will prompt that user to provide a reason for the cancellation, which the application will include in the notification to the other invitees. This collaborative deposition scheduling and notification system enables attorney users to more easily coordinate with co-counsel and opposing counsel to find mutually agreeable dates and times for depositions and other events.

The Upcoming Tasks list 564 on the Case screen 550 displays a list of upcoming events from the case calendar 552 specific to the selected case shown in the Case Title bar 556. The embodiment in FIG. 9 shows examples of possible upcoming tasks to which the Upcoming Tasks list would alert a user 104, 105, such as motions and depositions. The user 104, 105 has the option of selecting how far prior to an event the Upcoming Tasks list 564 should provide an alert for an event, for example, one week in advance or one month in advance.

When a user 104, 105 adds an event to his or her case calendar 552 for a particular case or accepts an invitation from another user, that event is also added to the user's global calendar 412 on the user's Home screen 400. The global calendar 412 displays all events for that particular user 104, 105 across all cases to which he or she is registered. In other words, when any event is added to the case calendar for any of that user's 104, 105 individual cases, that event also shows up on the global calendar 412 with a further indication as to what case that event pertains. Similar to the case specific Upcoming Tasks list 564, the global Upcoming Tasks list 410 provides a list of events from the global calendar 412 that are occurring in the near future. This Upcoming Tasks list 410 reflects events from all cases for which the user 104, 105 is registered and indicates the case the event pertains to and its respective date.

A user 104, 105 can search the application 114 using either the global Search button 408 on the Home screen 400 or with the case specific Search button 565 on the Case screen 550. The global Search button 408 prompts the user 104, 105 to enter a search term for the application 114 to search in all the user's cases or all of an attorney's firm's cases if that firm is a subscriber 103. Alternatively, the case specific Search button 565 allows a user 104, 105 to search within only the particular case in the Case Title bar 566. The application 114 also includes a searchable database of contact information for all attorneys and other users 104, 105 registered with the system.

Referring to the foregoing description and figures, the following is an example how some functions of the collaborative cloud-based litigation management system work:

User 104 is an attorney at law firm 106, and user 105 is an attorney at law firm 108, where law firm 106 represents the plaintiff in a case, and law firm 108 represents the defendant in the same case. Law firm 106 is a subscriber 103 with the service provider 102 with corresponding account 206. Law firm 108 is also a subscriber 103 with the service provider 102 with corresponding account 208. To initiate a case, user 104 selects the New Case button 506 in that user's Case screen 500 to cause the application to display the New Case screen 520. If known, user 104 fills out information on the New Case screen 520 pertaining to the defendant or the defendant's counsel. If the defendant or defendant's counsel is not also a subscriber 103, user 104 would need to serve the plaintiff's complaint using known service options and/or provide the defendant with information necessary to create an account 208 to use the application 114 and receive the complaint through the application. If the defendant or defendant's counsel is a subscriber 103, user 104 simply uploads the plaintiff's complaint to the application into the Pleadings folder 559. User 104 then searches the database for the defendant or defendant's attorney information and the application 114 generates a notification that a complaint against that party has been uploaded. Along with the complaint, user 104 also indicates whether any discovery requests are included in the complaint. If so, these requests are added to the Discovery folder 563. Upon uploading the complaint, a new case 212 is listed in the user's 104 Case list 402.

The notification generated by the application 114 and sent to the defendant includes a password to access the case created by user 104. Alternatively, user 104 must distribute the password to the other parties in the case by other means, such as e-mail or standard mail. When user 105 at firm 108 receives the notification, the user can log on to the application 114. At the user's 105 Home screen 400, case 212 appears in the Case list 402. When the user 105 selects case 212, the application 114 prompts the user to enter the password provided in the notification. Once user 105 enters the password, he or she is a registered user on that case and has access to the complaint, discovery requests, and other items uploaded for shared use. Once user 105 has registered, the user can uploaded the defendant's answer to the complaint into the Pleadings folder 559, any discovery responses or requests in the Discovery folder 563, and any motions in the Motions folder 561. The application 114 prompts user 105 to indicate whether the answer contains any cross claims or counter claims. If so, user 105 indicates the parties to which the claims are targeted and the application 114 establishes calendar events and deadline reminders as described above. Each registered user 104, 105 can then schedule meetings, depositions, upload documents, motions, or pleadings as detailed in the above description.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for managing litigation events comprising:
a physical computer-readable medium including a litigation management application having computer-executable instructions for managing litigation events;
a server operably associated with the physical computer-readable medium, the server adapted to execute the instructions for managing litigation events contained on the physical computer-readable medium;
a database operably associated with the server, the database containing litigation management event information that is accessible and modifiable by the server;
wherein the litigation management application contains computer executable instructions configured to:
maintain a first case calendar adapted to receive inputs from a first user selecting a plurality of dates for an event, wherein the event is a deposition of a witness produced by a second user, and generate a first notification for delivery to a second case calendar; and
maintain the second case calendar adapted to receive inputs from at least the second user selecting the at least one date from the plurality of dates selected by the first user for the event, and generate a second notification for delivery to the first case calendar indicating the date the second user selected;
receive an input from the first user selecting one of the at least one date from the plurality of dates selected by the second user;
add the event to the selected date on the first case calendar and the second case calendar; and,
at a predetermined time before the event, generate a notification to the first user requesting confirmation, cancellation, or modification of the event; and
generate a notification to the at least one second user indicating that the first user has either confirmed, cancelled, or modified the event.

2. The system of claim 1, wherein the litigation management application further contains computer executable instructions for receiving an input from the first user selecting one of the at least one date selected by the second user and for adding the event to the selected date on the first case calendar and the second case calendar.

3. The system of claim 1, wherein the litigation management application further contains computer executable instructions adapted to generate an e-mail message that is transmitted by the server to an e-mail address of the second user when the first user selects the at least one date for an event.

4. The system of claim 1, wherein the litigation management application further contains computer executable instructions permitting the first case calendar to receive inputs from the first user selecting at least one location for the event.

5. The system of claim 4, wherein the litigation management application further contains computer executable instructions permitting the second case calendar to receive inputs from the second user selecting at least one of the at least one location.

6. The system of claim 5, wherein the litigation management application further contains computer executable instructions permitting the second case calendar to generate a notification for delivery to the first case calendar indicating the location the second user selected.

7. The system of claim 2, wherein the litigation management application further contains computer executable instructions permitting the first case calendar to generate a notification to the second user when the first user selects one of the at least one date selected by the second user.

8. The system of claim 1, wherein the litigation management application further contains computer executable instructions permitting the litigation management application to generate a notification to the first user at a designated time prior to the event.

9. The system of claim 8, wherein the litigation management application further contains computer executable instructions permitting the litigation management application to receive inputs from the first user selecting that the date for the event is confirmed.

10. The system of claim 9, wherein the litigation management application further contains computer executable instructions permitting the litigation management application to generate a notification to the second user that the date for the event is confirmed when the first user selects that the date for the event is confirmed.

11. The system of claim 1, wherein:
the litigation management application further contains computer executable instructions permitting the litigation management application to generate a notification to the second user at a designated time prior to the date of the deposition.

12. The system of claim 11, wherein the litigation management application further contains computer executable instructions permitting the litigation management application to receive inputs from the second user indicating that the deposition is confirmed and generate a notification to the first user that the deposition is confirmed.

13. The system of claim 11, wherein the litigation management application further contains computer executable instructions permitting the litigation management application to receive inputs from the second user indicating that the deposition is cancelled and generate a notification to the first user that the deposition is cancelled.

14. The system of claim 13, wherein the litigation management application further contains computer executable instructions permitting the litigation management application to receive inputs from the second user indicating a reason for cancelling the deposition and include the reason in the notification to the first user.

15. A system for managing litigation documents comprising:
a physical computer-readable medium including a litigation management application having computer-executable instructions for managing litigation documents;
a server operably associated with the physical computer-readable medium, the server adapted to execute the instructions for managing litigation documents contained on the physical computer-readable medium;
a database operably associated with the server, the database containing litigation management document information that is accessible and modifiable by the server;
wherein the litigation management application contains computer executable instructions configured to:
maintain a first documents tab adapted to receive inputs from a first user to upload at least one litigation document to the database for display in the first documents tab;
calculate a deadline before which a respective response to the at least one litigation document is due, and display the deadline in the first documents tab, wherein the calculation is based on a type of the litigation document specified by the first user via a graphical user interface;
maintain at least one second documents tab adapted to receive inputs from at least one second user to upload the respective response to the at least one litigation document to the database for display in the second documents tab; and
indicate that the respective response is responsive to the at least one litigation document;
wherein the litigation management application contains computer executable instructions permitting the litigation management application to generate a first notification for delivery to the at least one second user when the first user uploads the at least one litigation document to the database and to generate a second notification for delivery to the at least one first user when the at least one second user uploads the respective response to the database;
wherein the litigation management application further contains computer executable instructions permitting the litigation management application to display the at least one litigation document in the at least one second documents tab when the first user uploads the at least one litigation document to the database, and to display the respective response in the first documents tab when the at least one second user uploads the response to the database;
wherein the litigation management application further contains computer executable instructions permitting the litigation management application to generate a reminder notification for delivery to the second user at a predetermined time before the deadline indicated by the first user.

16. The system for managing litigation documents of claim 15, wherein the litigation management application further contains computer executable instructions permitting the litigation management application to receive an input from the first user indicating the type of litigation document the first uploads to the database.

17. The system for managing litigation documents of claim 15, wherein the notification generated for delivery is an e-mail delivered to an e-mail address of the second user.

18. The system for managing litigation documents of claim 17, wherein the litigation management application further contains computer executable instructions permitting the e-mail delivered to the e-mail address of the second user to contain a link to view the uploaded document.

19. The system for managing litigation documents of claim 17, wherein the litigation management application further contains computer executable instructions permitting the e-mail delivered to the e-mail address of the second user to contain the uploaded document as an e-mail attachment.

20. A method of managing litigation documents, the method comprising:
accessing a physical computer-readable medium that includes a litigation management application having computer-executable instructions for managing litigation documents;
accessing a server adapted to execute the instructions for managing litigation documents contained on the physical computer-readable medium;
accessing a database containing litigation management document information that is accessible and modifiable by the server;
wherein the litigation management application includes:
a first documents tab adapted to receive inputs from a first user to upload at least one litigation document to the database for display in the first documents tab;
wherein the litigation management application is disposed to calculate a deadline before which a respective response to the at least one litigation document is due, and display the deadline in the first documents tab, wherein the calculation is based on a type of the litigation document specified by the first user via a graphical user interface;

at least one second documents tab adapted to receive inputs from at least one second user including uploading the respective response to the database for display in the second documents tab;

wherein the litigation management application is disposed to indicate that the respective response is responsive to the at least one litigation document;

wherein the litigation management application is adapted to generate a first notification for delivery to the at least one second user when the first user uploads the at least one litigation document to the database and to generate a second notification for delivery to the at least one first user when the at least one second user uploads the respective response to the database;

wherein the litigation management application is further disposed to permit the litigation management application to display the at least one litigation document in the at least one second documents tab when the first user uploads the at least one litigation document to the database, and to display the respective response in the first documents tab when the at least one second user uploads the respective response to the database; and wherein the litigation management application further contains computer executable instructions permitting the litigation management application to generate a reminder notification for delivery to the second user at a predetermined time before the deadline indicated by the first user.

* * * * *